July 1, 1924.

A. MORCH

BATTERY

Filed June 9, 1922

1,500,027

Anthony Morch, INVENTOR

BY Victor J. Evans ATTORNEY

WITNESS: Fred W. Ely.

Patented July 1, 1924.

1,500,027

UNITED STATES PATENT OFFICE.

ANTHONY MORCH, OF BROOKLYN, NEW YORK.

BATTERY.

Application filed June 9, 1922. Serial No. 567,098.

*To all whom it may concern:*

Be it known that I, ANTHONY MORCH, a citizen of the United States, residing at Brooklyn, in the county of Kings and State of New York, have invented new and useful Improvements in Batteries, of which the following is a specification.

This invention relates to the manufacture of galvanic cells, and the primary object is to provide a method of manufacturing dry cells which, while leading to the production of a cell of greater efficiency and longer life, will permit of convenient handling of the constituents during the assembling operation and allow for complete manufacturing of such cells with greater dispatch and with material saving in cost of production.

Another object of the invention is to provide a galvanic cell wherein the electrochemical effect will be greatly improved over the construction of other forms of cells and resistance of the cell reduced to a very desirable extent.

With the above and other objects in view which will appear as the nature of the invention is better understood, the same consists in the improved construction and novel arrangements of parts which will hereinafter be fully described and particularly pointed out in the claims.

In the accompanying drawing, has been illustrated, a single and preferred form of the invention, it being, however, understood that no limitations are necessarily made to the precise structural details therein exhibited, but that changes, alterations and modifications within the scope of the claims may be resorted to when desired.

In the drawings:—

Figure 1:
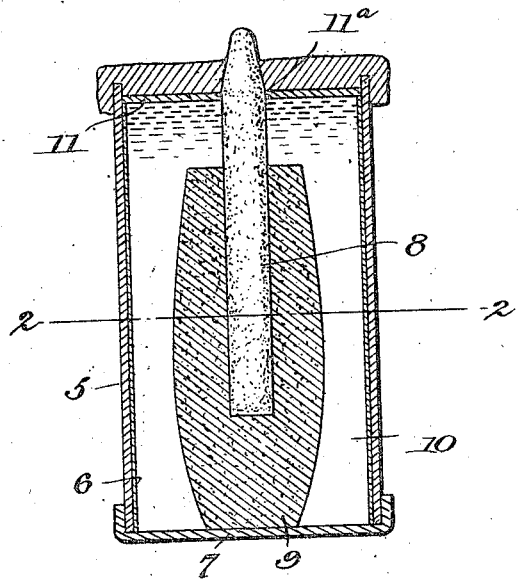
Figure 1, is a vertical section through the cell.
Figure 2:
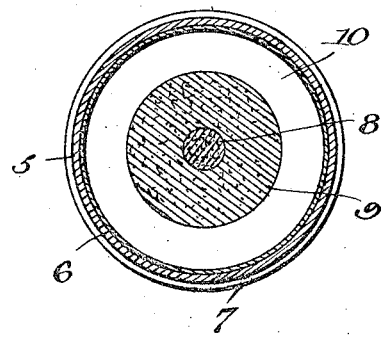
Figure 2, is a horizontal section on the line 2—2 of Figure 1.

In carrying my invention into practice, I employ a card board cylinder 5, open normally at each end and paraffined on its inner surface at 6. Secured to the lower end of this cylinder 5 is a zinc cap 7, constituting the negative pole of the cell.

Located within the cylinder and spaced from the walls thereof is a carbon electrode 8, the same being partly molded in a core 9, of depolarizing material. This core preferably consists of powdered graphite and carbon, moistened with ammonia and water and then pressed into the desired shape, whereby when same is arranged in the cylinder 6, the paraffined walls of the latter will surround the depolarizing core and the base of the latter will rest on the zinc cap 7.

The electrolyte 10 comprises a solution of about 95 grams of salammoniac dissolved in about 105 c. c. of ordinary ammonia, and a solution of about 50 grams of salammoniac dissolved in about 95 c. c. of water and approximately 40 grams of yellow dextrin. The solution of salammoniac and ammonia is inserted in the space between the depolarizing core 9 and the paraffined walls of the cylinder 5 and said space is thereby partly filled with said solution. I then take the solution of salammoniac, water and yellow dextrin and subject same to the action of heat at a temperature of about 60° C., constantly stirring same until the desired consistency is attained. This second solution is then poured into the space between said depolarizing core and the paraffined walls of the cylinder 5. The upper end of the cylinder is then closed by a card board disk 11, apertured at 11ª, to permit the tapered end of the electrode 8, to pass therethrough. I then hermetically seal the said upper end of the cylinder with a plastic composition consisting of molten rosin and red lead, the same being poured upon the cardboard disk 11 and around the edges thereof and around the aperture 11ª of said disk. By excluding air from the cylinder 5, and by heating the electrolyte as described, the said electrolyte will be properly gelatinized without subjecting the cell to any further heating process.

From the construction and method set forth, it is seen that I entirely eliminate all necessity of heating the cell after introduction thereto of the electrolyte and that from the nature of said electrolyte and the manner of preparing same, it will be properly gelatinized the moment it is placed in the cell and hermetically sealed therein. I find that by using a receptacle consisting of a cardboard cylinder paraffined on its inside, the device can be constructed and produced at far less expense than a zinc cylinder and in practice, I also find that a cell cylinder formed chiefly of cardboard and provided with a zinc cap such as the one shown at 7 in the drawing, and associated with my improved form of depolarizing core and said electrolyte, results in the production of more light and less heat when the battery is in operation. From the construction described, I am able to employ a depolarizing core molded around the carbon electrode without the aid of outside wrappers, binders or the like, and when used in connection with my improved form of electrolyte, no danger will be experienced of the core disintegrating and without danger of short-circuiting the cell. I am able to do away with a cell receptacle constructed entirely of zinc, thus greatly reducing the cost of manufacture of the cell. By paraffining the inner walls of the cell cylinder 5, the excitant is held against eating through said walls before the mass of zinc contained in the cap 7 is destroyed. This construction, taken in connection with the described means for sealing the cylinder 5, further serves to hold the electrolyte against evaporation. The cell can be rapidly filled without undue loss of fluid, and without subsequently subjecting the cell to the action of heat, and as a matter of fact, the components of the cell can each be handled without fear of local danger during the assembling operation, and as the depolarizing core is constructed without the usual wrapping of cheese cloth, the electrical action of the cell is gratly improved, and the resistance of the battery is reduced to a very appreciable extent.

While I have fully shown and described and have pointed out in the appended claims certain novel features of construction, arrangement and operation which characterize my invention, it will be understood by those skilled in the art that varous omissions, substitutions and changes in the forms, proportions, sizes, of the materials used, and of their operation, may be made without departing from the spirit of my invention.

What is claimed as new is:—

1. The process of manufacturing a galvanic cell, which comprises, compounding an electrolyte mixture comprising a solution of salammoniac dissolved in ammonia, and a solution of salammoniac, dissolved in yellow dextrin, heating the second named solution to effect gelatinization, introducing the solutions and a depolarizing core into a card board cylinder, closing one end of the cylinder with a zinc cap and closing the opposite end of the cylinder with a cardboard disc and a plastic composition consisting of red lead and rosin.

2. The process of manufacturing a galvanic cell, which comprises, compounding an electrolyte mixture comprising a solution of salammoniac dissolved in ammonia, and a solution of salammoniac dissolved in yellow dextrin, heating the second named solution to effect gelatinization, introducing a depolarizing core into a cardboard cylinder, closing one end of the cylinder with a zinc cap, introducing a quantity of the first named solution between the walls of the cylinder and said depolarizing core; then introducing a portion of the second named solution between said core and the walls of the cylinder and finally closing the opposite end of said cylinder with a card board disc and a plastic sealing substance while permitting the electrode of the core to project through said cap.

3. The process of manufacturing a galvanic cell, which comprises compounding an electrolyte mixture, comprising a solution of ammonia and a solution of salammoniac dissolved in yellow dextrin, heating the second named solution to effect gelatinization, introducing both solutions and a depolarizing core into a card board cylinder, closing one end of the cylinder with a zinc cap, and closing the opposite end of the cylinder with a card board disc and a plastic sealing substance.

4. The process of manufacturing a galvanic cell which comprises compounding an electrolyte mixture, comprising a solution of salammoniac dissolved in ammonia, and a solution of salammoniac dissolved in a glutinous substance, heating the second named solution to effect gelatinization, introducing the first solution while in a cold state and a depolarizing core into a cylinder having a zinc surface and sealing the cylinder with a disc of a plastic composition.

5. The process of manufacturing a galvanic cell which comprises compounding an electrolyte mixture, comprising a solution of ammonia, and a solution of salammoniac dissolved in a glutinous substance, heating the second named solution to effect gelatinization introducing both solutions and a depolarizing core into a zinc walled cylinder and sealing the cylinder with a card board disc and a plastic sealing substance, while permitting the electrode of the core to protrude through said disc.

In testimony whereof I have affixed my signature.

ANTHONY MORCH.